(12) United States Patent
Öttinger et al.

(10) Patent No.: US 6,746,771 B2
(45) Date of Patent: Jun. 8, 2004

(54) IMPREGNATED BODIES MADE OF EXPANDED GRAPHITE, PROCESS FOR PRODUCING SUCH BODIES AND SEALING ELEMENTS, FUEL CELL COMPONENTS AND HEAT-CONDUCTING ELEMENTS FORMED OF THE BODIES

(75) Inventors: Oswin Öttinger, Meitingen (DE); Jürgen Bacher, Wertingen (DE); Werner Langer, Altenmünster (DE)

(73) Assignee: SGL Carbon AG, Weisbaden (DE)

( * ) Notice: Subject to any disclaimer, the term of this patent is extended or adjusted under 35 U.S.C. 154(b) by 51 days.

(21) Appl. No.: 10/006,418

(22) Filed: Dec. 7, 2001

(65) Prior Publication Data

US 2002/0114952 A1 Aug. 22, 2002

(30) Foreign Application Priority Data

Dec. 7, 2000 (DE) .......................... 100 60 839

(51) Int. Cl.⁷ ............................... B32B 27/38
(52) U.S. Cl. ...................... 428/413; 428/408; 428/414; 428/103
(58) Field of Search ................. 428/413, 408, 428/414, 103

(56) References Cited

U.S. PATENT DOCUMENTS

| | | |
|---|---|---|
| 3,404,061 A | 10/1968 | Shane et al. |
| 3,494,382 A | 2/1970 | Shane et al. |
| 3,573,122 A | 3/1971 | Olstowski et al. |
| 4,265,952 A | 5/1981 | Caines |
| 4,729,910 A | 3/1988 | Fukuda et al. |
| 5,679,730 A * | 10/1997 | Amano et al. ............... 523/415 |
| 6,037,074 A | 3/2000 | Mercuri et al. |
| 6,531,236 B1 * | 3/2003 | Hatoh et al. .................. 429/34 |
| 2001/0046560 A1 | 11/2001 | Fong et al. |

FOREIGN PATENT DOCUMENTS

| | | |
|---|---|---|
| DE | 35 12 867 C2 | 6/1987 |
| DE | 32 44 595 C2 | 3/1989 |
| DE | 43 32 346 A1 | 3/1995 |
| EP | 0 087 489 | 9/1983 |
| GB | 2 131 500 A | 6/1984 |
| WO | WO 98/09926 | 3/1998 |
| WO | WO 99/16141 | 4/1999 |

OTHER PUBLICATIONS

Campbell, Ian M., Introduction to Synthetic Polymers, Oxford Science Publications, 1994, p. 156.*
Abstract, 01158269A, Nishida et al., Jun. 21, 1989.
Abstract, JP 60242041A2, Fukuda et al. Dec. 2, 1985.
Abstract, JP 1100040A2, Hesuda et al. Apr. 18, 1989.
Abstract, JP 1308872A2, Kuboki et al Dec. 13, 1989.
Abstract, JP 11354136A2, Teskiro et al. Dec. 24, 1999.
Anonymous: "GRAFTECH Material Safety Data Sheet", XP–002231629, 4 pp.
Anonymous: "HERNON Porosity Sealant (HPS) 991 Technical Data Sheet", XP–002231628, 3 pp.

* cited by examiner

*Primary Examiner*—Robert Dawson
*Assistant Examiner*—Christopher Keehan
(74) *Attorney, Agent, or Firm*—Laurence A. Greenberg; Werner H. Stemer; Ralph E. Locher

(57) ABSTRACT

Bodies made of expanded graphite are impregnated with low-viscosity, solvent-free, storage-stable, polymerizing resins from the group of isocyanates and their co-reactants and/or epoxy resins up to resin contents of 50% by weight. A primary product is made of expanded graphite with an open pore system, with a particularly preferred range of bulk densities of from 0.5 to 1.3 g/cm³ and with an ash value of not more than 4% by weight. Such bodies can also contain a proportion of additives. Sealing elements, components in fuel cells and heat-conducting elements are formed of the impregnated, shaped and rapidly curable graphite bodies. A process for producing such bodies is also provided.

27 Claims, No Drawings

IMPREGNATED BODIES MADE OF EXPANDED GRAPHITE, PROCESS FOR PRODUCING SUCH BODIES AND SEALING ELEMENTS, FUEL CELL COMPONENTS AND HEAT-CONDUCTING ELEMENTS FORMED OF THE BODIES

BACKGROUND OF THE INVENTION

FIELD OF THE INVENTION

The invention relates to a synthetic resin-impregnated body made of expanded or at least partially recompressed expanded graphite, a process for producing such a body and a sealing element, a fuel cell component and a heat-conducting element employing the body. In this context, the term "synthetic resin-impregnated body" is understood to mean a body made of expanded graphite which is impregnated by synthetic resin.

Material composites of graphite and plastics are widely used in many technical applications. For example, particles of electrographite are processed with fluoroplastics into highly corrosion-resistant components for the construction of chemical apparatus, but they are comparatively expensive due to the costs of the fluoroplastics and of the processing technique that is required. A subject which in terms of content is even closer to the present application is set out in U.S. Pat. No. 4,265,952: expanded graphite is mixed, for example, with fine PTFE powder and subsequently compressed. To that extent, the production technique differs from the impregnating technique described in the present application.

Another example of a material composite of graphite and plastics material is superficially resin-impregnated foils made of natural graphite, which are predominantly employed in the form of flat seals against particularly aggressive media. Many references to that second example are found in the technical literature.

Today, thousands of tons of foils made of natural graphite are produced worldwide every year. The process used therefor is described in European Patent Application 0 087 489 A1, U.S. Pat. Nos. 3,404,061 and 3,494,382. Those disclosures are incorporated by reference in the present application. The teaching of those references can be summarized as follows: an intercalating agent such as concentrated sulfuric acid, for example, acts on natural graphite, preferably plate-like or flaky natural graphite, in the presence of an oxidizing agent such as concentrated nitric acid or hydrogen peroxide, for example. That results in graphite intercalation compounds that are likewise flaky or have a platelike shape. The flakes are thermally decomposed and, as a result of the gas pressure arising in their interior during that decomposition process, puff up to form loose graphite particles with a wormlike shape by brief heating, for example by introduction into the flame of a gas burner. That product is also referred to as "expanded" graphite or as graphite expandate.

Expanded graphite is extremely plastic and can be readily shaped without the aid of a special binder while being compressed to a greater or lesser degree. Economically, the most important product thus produced is a flexible graphite foil, which can be produced efficiently on calender belts. Such products have typical bulk densities of between 0.7 and 1.3 g/cm$^3$. However, other parts having different geometry, for instance individual sealing bodies which, on average, are compressed to a greater degree and have bulk densities of 1.0 to 1.8 g/cm$^3$, are also possible. There are also sponge-like parts, on average having low bulk density, with values of 0.1 to 1.0 g/cm$^3$. All of those bodies with different shapes and different bulk densities have an open pore system. They are referred to hereinbelow as a "primary product".

Material composites formed of such a primary product and synthetic resins or plastics materials perform a variety of tasks. Synthetic resins or plastics materials lower the permeability, improve the surface properties, for example the scratch resistance, increase the strength to a small extent, lower the thermal stability of a material composite containing expanded graphite, and can also reduce the electrical conductivity or modify the resistance to media. An expedient technique for the production of such material composites is impregnation.

According to German Patent DE 32 44 595 C2, corresponding to UK Patent Application GB 2 131 500 A, the sticking action of graphite foils to metal surfaces can be reduced by impregnating the primary product with furan resin in regions close to the surface.

According to the prior art, the substantial impregnation of shaped bodies made of expanded and partially recompressed graphite is difficult. In order to overcome the difficulties, International Publication No. WO 99/16141, corresponding to U.S. Pat. No. 6,037,074, teaches that such a body can be satisfactorily impregnated when mineral fibers are interspersed therein. Those fibers also pass through the surface of the particular bodies. In that way, small channels are formed along those mineral fibers, in which the resin can flow into the interior of the bodies during the impregnation. In that specification, a phenolic resin dissolved in acetone, i.e. a solvent-containing thermosetting resin with condensation reactions during the curing, is named as the impregnating agent.

Another method for achieving good impregnation of bodies made of expanded graphite resides in converting the desired resins through the use of solvents into low-viscosity liquids, whereby the impregnation becomes more complete. In Published Japanese Patent Application JP 11 00 040 A2, the thermosetting resins named are based on phenols, epoxides, polyimides, melamines, polyesters and furans, which are used in a mixture solution with polyvinylbutyral.

Published Japanese Patent Application JP 1 308 872 A2 describes the solution to other problems. A material composite formed of a glass fiber nonwoven fabric and an expanded graphite foil is produced in order to thus strengthen the latter and overall obtain a liquid-tight material. That is achieved by impregnating with epoxy resin. The resin penetrates the nonwoven fabric, with the composite material being formed during the subsequent curing of the support part. At the same time, the resin also penetrates into the surface, i.e. partially into the foil, and seals the latter.

The impregnation of expanded graphite foil with phenolic resin or epoxy resin, which is set out in Published Japanese Patent Application JP 60 24 2041 A2, corresponding to German Patent DE 35 12 867 C2, serves similar purposes, namely to improve strength and gas-tightness. The special feature in that case lies in a degassing process for the liquid resins and the foil present therein which is repeated a number of times, presumably with the aim of improving the quality of the impregnation.

German Published, Non-Prosecuted Patent Application DE 43 32 346 A1 describes the impregnation of the expanded graphite foils for the purpose of improving adhesion to elastomer layers lying thereon. The viscosity of the epoxy resins used in that case is 2100 to 2400 mPa·s.

Published Japanese Patent Application JP 11 35 4136 A2 entitled "Fuel Cell, Separator for Fuel Cell, and Manufacture Therefor" describes the production of expanded graphite in sheet-like form. That partially recompressed expanded graphite is subsequently comminuted (pulverized) and then mixed selectively with resins, solvent-free epoxy resin, solid epoxy resin, melamine resin, acrylic resin, phenolic resin, polyamide resin, and the like. That mixture is subsequently shaped. As will be shown later, that technique differs from the bodies according to the present invention which have an entirely different structure in that the resins are mixed into an expanded graphite granulate.

The prior art set out above discloses various synthetic resin-containing bodies produced by using expanded graphite as well as processes for their production. That it is difficult to produce high-quality, synthetic resin-containing graphite bodies from recompressed, expanded graphite is easy to see. All of the processes described have disadvantages, some of which are serious: if resins diluted by solvents and thus having lower viscosity are used during the impregnation, it is true that the impregnation is easier. However, the vapors from the, in most cases, readily volatile solvents cause serious problems during the impregnation itself, especially during subsequent process steps. In particular, as a result of the fact that they escape during the curing of the resins, they leave behind fine channels which raise the permeability of the bodies being produced. If an increased permeability can be neither tolerated nor is desired, a general problem exists. Furthermore, if the curing is not performed very slowly, i.e. is time-consuming, blisters and cracks are formed in the bodies, which lower their quality considerably.

The same applies to resin systems which release gases from condensation reactions during the curing. As a result of the fact that solvents or other gases and vapors escape, a residual porosity arises in the bodies. Attempts are now frequently made to eliminate the residual porosity by one or more additional impregnating operations. The attendant increase in expenditure is clear and the success is really limited. Additionally, solvent-containing resins above all always require measures to allow their safe handling and the harmless removal or recovery of the solvents, which increases the expenditure even further. However, the solution through the addition of fibers penetrating the surfaces of the body may improve the impregnating properties of the body but does not eliminate the problems outlined for the use of solvent-containing resins releasing vapors or gases. In addition, one always has a product containing certain fibers, which is more expensive to produce.

SUMMARY OF THE INVENTION

It is accordingly an object of the invention to provide bodies formed of expanded or at least partially recompressed expanded graphite having a liquid-accessible pore system which is completely or partially filled with an uncured or partially or completely cured synthetic resin, a process for producing the bodies and sealing elements, fuel cell components and heat-conducting elements formed of the bodies, which overcome the hereinafore-mentioned disadvantages of the heretofore-known products and processes of this general type and in which the bodies do not contain any defects such as blisters or cracks that may be caused by reactions of the synthetic resin during the curing, in which the bodies are producible with comparatively little expenditure and in which the bodies are corrosion-resistant, electrically and thermally conductive and are from liquid-permeable to gas-tight, depending on the degree of compression.

With the foregoing and other objects in view there is provided, in accordance with the invention, a synthetic resin-impregnated body, comprising expanded or at least partially recompressed expanded graphite. The graphite contains or is impregnated with solvent-free, low-viscosity, storage-stable resin systems from the group of isocyanates with their co-reactants and/or epoxy resins or polymers obtained by curing the resin systems.

Therefore, the object of the invention is achieved with a body of the type mentioned at the outset, that is the primary product or the body obtained from the impregnated primary product, by at least partial compression containing either solvent-free and low-viscosity resin systems from the group of isocyanates and their co-reactants, which react to form isocyanurates, urethanes or polyurethanes, and/or of epoxides or cured resin systems produced from the aforementioned group. The resin systems enter into the body by impregnating the primary product with solvent-free, low-viscosity, storage-stable resin systems from the group of isocyanates and their co-reactants and/or of epoxides.

In order to eliminate the aforementioned disadvantages of solvent-containing resin systems and nevertheless achieve the advantages of resin systems having low viscosity, the following special solvent-free resin systems are employed according to the invention presented herein:

1. Epoxy resin systems 1: These epoxy resin systems are characterized by the main components bisphenol-A-diglycidyl ether and methylhexahydrophthalic anhydride. According to the manufacturer's information, the former component constitutes more than 50% by weight and the latter component between 25 and 50% by weight of the total mixture. The mixtures contain a latent catalyst which has a crucial influence on the times when curing at elevated temperatures. Where possible, the resin system does not contain any catalyst. These resin systems have typically, at room temperature, a viscosity of 500±100 mPa·s, and at a slightly elevated processing temperature of 50° C., typically a viscosity of about 70±15 mPa·s.

2. Epoxy resin systems 2: These epoxy resin systems are characterized by the main components bisphenol-F-diglycidyl ether and methylhexahydrophthalic anhydride. According to the manufacturer's information, the former component constitutes more than 50% by weight and the latter component between 25 and 50% by weight of the total mixture. The mixtures additionally contain a latent catalyst which has a crucial influence on the times when curing at elevated temperatures. Where possible, the resin system does not contain any catalyst. These resins systems have typically, at room temperature, a viscosity of about 200±40 mPa·s, and at a slightly elevated processing temperature of 50° C. typically a viscosity of about 40±10 mPa·s.

3. Isocyanate resin systems: These resin systems are characterized by the main components diphenylmethane diisocyanate and bis(4,4'-glycidyloxyphenyl)propane. According to the manufacturer's information, the former component constitutes 75 to 85% by weight and the latter component between 15 and 25% by weight of this partial mixture. Such resin systems are referred to as modified isocyanurate resin systems. One hundred parts of this partial mixture are mixed with five to ten parts of a modified diphenylmethane diisocyanate, which acts as a latent catalyst. The partial mixtures of diphenylmethane diisocyanate and bis(4,4'-glycidyloxyphenyl)propane have, at room temperature, a viscosity of 40±10 mPa·s, and the modified diphenylmethane diisocyanate has a viscosity of 20±5 mPa·s. The stated total mixtures of one hundred parts of the partial mixture and five to ten parts of the modified diphenylmethane diisocyanate have viscosities in the range of from 25 to 40 mPa·s.

The low viscosities, which are essential to the invention, at the processing temperature of the impregnating resins from the three resin systems, ensure good and efficient impregnation of the primary product. The polyadditions which take place during the curing do not give rise to any low-molecular-weight cleavage products, which could cause blistering or even cracks in the body. The testing of the resin systems is described in more detail in the examples.

On one hand, the (latent) catalysts bring about rapid curing reactions at high temperatures and, on the other hand, they bring about small changes in the chemical process of the resin systems at low temperatures, for instance room temperature, which are employed during the impregnation. These small changes can be proved with the aid of viscosity measurements.

Since the viscosities of the above-stated epoxy resin systems at room temperature are several hundred mPa·s, but the impregnating action is particularly advantageous at viscosities of below one hundred mPa·s, the impregnation with these resin systems is preferably carried out at slightly elevated temperatures in the range of from 40 to 60° C. These slightly elevated temperatures first of all bring about a drastic reduction of the viscosity, but then, in time, a slightly more rapid rise of the viscosity occurs than at room temperature. However, this does not have an adverse effect on the processing behavior of the resin systems. This is shown by the viscosities, which are given below by way of example, of the epoxy resin systems 2 with the component bisphenol-F-diglycidyl ether. Throughout the investigation period, the resin system is maintained at 50° C.:

a fresh resin mixture has approximately 35 mPa·s, after 6 days it has approximately 60 mPa·s and after 12 days it has approximately 150 mPa·s.

The resin system including isocyanate and the co-reactants, which react in time to form isocyanurates, urethanes or polyurethanes, is maintained at room temperature throughout the investigation period and then shows the following viscosities in mPa·s:

a fresh mixture has approximately 35, after three days it has approximately 45, after 10 days it has approximately 50 and after fourteen days it has approximately 60.

The small rate of the changes of the viscosity of the resin systems at low temperatures, for instance room temperature for isocyanates and their co-reactants and 50° C. for epoxy resin systems, and over a period of almost two weeks, which is demonstrated by the viscosity measurements, will be referred to hereinafter by the term "high storage stability".

It has been found that the storage stability of the resin systems is not changed by the impregnating operation itself and by the fact that the resin systems are present in the primary product after the impregnation. This has been shown indirectly, for example, by comparing curing times of pure resin systems and impregnated primary products. In both cases, the same curing times were measured and no differences were found in the quality of the cured resins.

Once the resin has been introduced into the primary product, it tends not to run out of the primary product again. Besides wetting behavior, the following considerations, in particular, are important:

1. During the impregnation, special techniques, such as vacuum or vacuum-pressure impregnation, for example, are employed. The filling of part of the existing pores is only made possible with the aid of such techniques. For example, filling resistances, such as the flow through narrow pore necks, are overcome in this way. Once the resin has been introduced in this way it cannot escape from the primary product again, without employing any special measures.
2. As explained above, the viscosity of the resins once introduced rises gradually. This rise is small at low temperatures (storage stability), but becomes very pronounced at higher temperatures, causing resins to gel. It is virtually impossible for such partially gelled resins to escape from the impregnated body.

The expanded graphite used to produce the primary product is formed of fanned-out, wormlike structures in which very fine graphite platelets are joined together in the form of a defective accordion bellows. During the compression of the primary product, these platelets slide in and over one another. They become interlocked and thus come into contact again so as to no longer be able to be released without destruction. This gives rise in the primary product to a porous graphite framework or network which has good electrical as well as good thermal conductivity due to the good contacts between the graphite platelets. Since these properties are based on the framework function of the graphite in the primary product, they are not adversely affected by the impregnation with synthetic resin. They can even be further improved during a subsequent compression of the primary product impregnated with resin.

The primary product is permeated throughout by open pores which are interconnected in a variety of ways. As a result of this network of interconnected pores, the synthetic resin penetrates into the primary-product body during the impregnation and may even completely fill it under suitable conditions. The network of pores then becomes a network of synthetic resin. Both networks, the graphite network and the pore/synthetic resin network, in combination result in the outstanding properties of the end products thus produced. It is also possible to control the level of properties of the end products by adjusting them in a specific manner. For example, on one hand, a primary-product body which has undergone little precompression and is thus highly porous has a lower electrical and thermal conductivity and a lower degree of anisotropy than a more highly compressed primary-product body. On the other hand, it can take up more synthetic resin and has modified strength properties. This situation is reversed with greatly compressed primary-product bodies. After the impregnation and curing of the synthetic resin, they yield products with improved electrical and thermal conductivity, as well as good mechanical strengths. All of the bodies according to the invention which are described herein are highly impermeable to liquids and gases when their pore network has been completely filled with synthetic resin.

The product described in International Publication No. WO 98/09926 differs from that presented herein in that, in the former, a graphite foil is provided merely with a coating of plastics material for the purpose of reinforcement. The plastics material covers the surface and partially penetrates into the foil.

All of the known methods such as, for example, those described in Published Japanese Patent Application JP 60 24 2041 A2, corresponding to German Patent DE 35 12 867 C2, can be used for the impregnation of the primary-product bodies. It is preferable, however, to use immersion methods, in particular immersion methods with prior evacuation of the vessel containing the primary-product body and flooding of the evacuated vessel with the synthetic resin. Where appropriate, the vessel is also subjected to a gas pressure after it has been flooded with the synthetic resin. If the primary-product body is to be merely impregnated close to the surface or is to be partially impregnated, the impregnating period is shortened or the surfaces from which the impregnation is to start are suitably coated or sprayed with synthetic resin or the body is only partially immersed. Following that treatment, the excess resin is removed from the surface.

An essential aspect of the present invention is efficient, damage-free impregnation and curing. The rapid blister-free and crack-free curing made possible by virtue of the polyaddition reactions has been discussed above. Efficient impregnation depends essentially on the viscosity of the resin systems. This is shown by the following comparison for the vacuum impregnation at 50° C. of a primary product of the same type having the following features: flexible graphite foil with a bulk density of 1.0 g/cm³ and a thickness of 1.0 mm:

| Resin system | Viscosity (mPa · s) | Impregnating period (h) | Resin uptake (% by weight) |
|---|---|---|---|
| Epoxy resin systems 2 | 40 | 5 | 15 |
| Epoxy resin systems 1 | 70 | 5 | 8 |

It is thus possible to introduce about twice the amount of resin into the primary product with the low-viscosity epoxy resin systems 2 than with the higher-viscosity resin systems 1, for otherwise identical boundary conditions and within the same period. If the intention is to introduce merely the smaller amount of resin indicated in the table, this is achieved in an impregnation with the low-viscosity epoxy resin systems 2 in only half the impregnating time as compared with the epoxy resin systems 1. A rapid impregnating operation is of great importance for efficient and cost-effective manufacture.

The primary product can take up an amount of up to 100% of its own weight of resin, depending on the degree of compression of the primary product and the open pore volume which is conditional thereon. If, however, a high electrical conductivity is desired of the end product, it is expedient to start with a primary-product body which has undergone greater precompression and has a lower open pore volume and can then, for example, take up only 20% by weight of resin based on its own weight. After the curing of the resin, such a body can be highly impermeable to liquids and gases, as seen in the examples, and has good strength properties.

Particularly epoxy resins, as well as isocyanate resins with their co-reactants, are known for the fact that their curing reactions start gradually and can also be slowed down again with suitable temperature control. In the case of epoxy and isocyanate resins it is thus possible to preserve a partially reacted, gel-like state, which is also called a "B state" in technical terminology.

In the B state the synthetic resins have a higher viscosity, but can still be shaped. This B state is advantageously used within the framework of the present invention. Thus, for example, resins or primary-product bodies or parts impregnated with the resins can be stored over a prolonged period of time or transported during this time. Further steps for the intermediate treatment of the impregnated bodies are possible. For example, such bodies can be machined, e.g. cut, or a number of them can be laminated together to form a stack. However, the fact that the primary-product bodies containing a resin in the B state can be brought into their final shape in suitable shaping configurations and molds is of particular importance for the invention. During the accompanying pressure treatment, the gel-like resins are, in practice, no longer squeezed out of the pore system of the body as is the case in an uncontrollable manner with resins which cannot be converted into a gel state. After the shaping, the resin part of the resin-impregnated primary-product body is cured. This is carried out, for example, in a curing chamber at the prescribed temperatures and times.

If the shaping configurations are equipped with apparatus for curing the resins, the shaping operation can even be combined with the curing of the resin in the body. The desired end product is thus obtained directly in an advantageous manner. Such a procedure is interesting particularly when relatively large series of components or bodies are to be produced by using the techniques described above and a number of process steps are to be efficiently combined in the manner outlined. It is convenient for the impregnated primary product, which is generally in the form of a semifinished product or blank, to be put into a mold which is already hot and for the mold to be closed for this purpose. The semifinished product thereby takes on the desired geometry, is simultaneously thoroughly heated and cures completely.

The curing takes place at 120 to 180° C. with latently catalyzed resin systems from the group of isocyanates and their co-reactants or/and from the group of the epoxides. A curing time of two hours is sufficient with such systems if the temperatures lie at the lower end of the specified temperature range. If a relatively high temperature at the upper end of the specified temperature range is chosen, a curing time of fifteen minutes is sufficient.

When resin systems from the group of isocyanates and their co-reactants or/and from the group of epoxides are not latently catalyzed, curing is effected in the same temperature range of 120 to 180° C., but curing times of twenty-four to forty hours are then necessary. If a relatively high temperature at the upper end of the specified temperature range is chosen, a curing time of twenty-four hours is sufficient. If the temperatures lie at the lower end of the specified temperature range, curing for up to forty hours is required.

A relatively wide variety of graphites based on synthetic production and natural occurrence exists, both types being mentioned in U.S. Pat. No. 3,404,061. Only natural graphite will be discussed hereinbelow, with the graphite being present as raw material in the bodies described herein.

Natural graphite is obtained by mining and is separated from the gangue rock with considerable effort. Nevertheless, very small amounts of rock also remain, attached to the natural graphite flakes or having intergrown into the flakes. Those "foreign constituents" are characteristic of every source of natural graphite and can also be specified as an ash value. A method for determining such ash values is described in DIN (German Industrial Standard) 51 903 under the title "Testing of Carbon Materials—Determination of the Ash Value".

In view of the end uses of the synthetic resin-containing graphite bodies according to the invention, the ash values and ash composition of the graphite that is present are quite important.

If such bodies are employed, for example as inherently corrosion-resistant seals in installations subjected to corrosive media, certain ash constituents together with the corrosive medium may result in pitting in the corrosion-resistant seals adjoining flanges or bushes of stuffing-box packings and eventually lead to the failure thereof.

Another example of a possible adverse effect of too high an ash value or an unfavorable ash composition of the graphite in a synthetic resin-containing body according to the invention is found in fuel cell technology. Thus, for example, bipolar plates of proton exchange membrane fuel cells can be produced from the material according to the invention. If such a plate now has too high an ash content, some of the harmful ash constituents may be released from the plate during the operation of the fuel cell and poison the sensitive catalysts located close to the surfaces of the bipolar plate, resulting in a premature loss of power of the cell.

Due to the potential adverse effects of an excessively high ash content, the ash content of the graphite used to produce the bodies according to the invention is 4 per cent by weight and less, preferably less than 2 per cent by weight and in special cases no more than 0.15 per cent by weight.

It may be convenient to strengthen the body according to the invention with fillers, with the selection of the fillers having to be matched to the application (e.g. a fuel cell). Fillers may be electrically conductive materials closely related to expanded natural graphite, such as, for example, materials from the group consisting of naturally occurring flake graphites, synthetically produced electrographites, carbon blacks or carbons, and graphite or carbon fibers. Furthermore, use may be made of silicon carbide in granular or fibrous form or even electrically non-conductive ceramic or mineral fillers in granular, platelike or fibrous form, such as silicates, carbonates, sulfates, oxides, glasses or selected mixtures thereof.

The bodies according to the invention can be used wherever electrically and thermally conductive components of low weight together with good corrosion resistance are required. Further properties which are essential for various applications are low ash values and relatively high impermeability. The bodies according to the invention are used in particular for components of fuel cells, for seals and for heat-conducting elements, for example for conducting away the excess heat from integrated circuits.

Other features which are considered as characteristic for the invention are set forth in the appended claims.

Although the invention is described herein as embodied in impregnated bodies made of expanded graphite, a process for producing such bodies and sealing elements, fuel cell components and heat-conducting elements formed of the bodies, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples. In addition, methods for obtaining data on electrical properties and gas-tightness for the examples are dealt with now.

In order to determine gas-tightness, a resin-impregnated graphite body was pressed as a separating plate (test specimen) between two chambers of a testing apparatus. A constantly maintained helium gas pressure of 2 bar absolute prevailed in a first chamber. A metal grid which mechanically supported the test specimen was disposed in a second chamber. In addition, this chamber was connected at ambient pressure to a liquid-filled burette, such as that which is used, for example, in the leakage measurement of flat seals according to DIN 3535.

The helium gas emerging from the first chamber and diffusing through the test specimen was collected in the second chamber and measured by displacement of the liquid in the burette. It was thus possible to determine the volume of the helium gas which diffused through the sample per unit of time. While taking the helium density and the testing area into account, a leakage rate was ascertained which is specified by a unit $mg/(m^2 \cdot s)$.

The material composite of partially recompressed expanded graphite and synthetic resin has anisotropic properties, i.e. the individual graphite platelets of the expanded graphite have a preferred orientation due to the production technique. For example, the electrical resistance parallel to this preferred orientation is low and perpendicularly thereto it is higher. In the present case, the cured shaped bodies according to the invention were characterized comparatively by measuring the electrical resistance perpendicularly to the preferred orientation of the graphite layers. For this purpose, the body was clamped between two gold-plated electrodes with a diameter of 50 mm, with defined and in each case identical surface pressure. The electrical resistances R established with the aid of a device (Resistomat 2318) from the firm Burster (Gernsbach, Germany) are specified by a magnitude [$m\Omega$] hereinbelow.

EXAMPLE 1

Plates made of partially recompressed expanded graphite (primary-product plates) with an ash value of less than 2% by weight, a thickness of 1 mm and a bulk density of 1.0 $g/cm^3$ are subjected to a vacuum impregnation treatment with latently catalyzed epoxy resin systems. Epoxy resin systems 1 and 2 were used, and came from the firm Bakelite (Duisburg, Germany). Epoxy resin systems 1 bear the trade name Rütapox VE 4834 and had a viscosity of approximately 70 mPa·s at 50° C. Epoxy resin systems 2 bear the trade name Rütapox M4-1158-CK and had a viscosity of approximately 40 mPa·s at 50° C.

The primary-product plates were introduced into an evacuable receptacle and heated to 50° C. After application of a vacuum (approximately 10 mbar residual pressure), the resin system which had been previously heated to 50° C. was sucked into the receptacle, so that the primary-product plates were completely surrounded by resin. After the impregnating period indicated in Table 1, the now impregnated plates were taken out of the bath and, after the resin adhering to the surface had been wiped off, were weighed. The impregnated plates were subsequently cured at 150° C. in a preheated circulating-air oven for 30 minutes. Despite this shock curing, the plates showed no blisters or cracks at all. The values determined for the impregnating experiments with the epoxy resin systems 1 and 2 and comparative values for a non-impregnated primary-product plate of the same type are summarized in Table 1. The resin system used, the impregnating period, the resin content of the impregnated body determined after the curing, its electrical volume resistance R, measured perpendicularly to the preferred orientation of the graphite platelets, and the helium permeability λ measured perpendicularly to the preferred orientation of the graphite platelets, are shown.

TABLE 1

|  | Impregnating period [h] | Viscosity [mPa·s] | Resin content [%] | R [mΩ] | λ [mg/(m²·s)] |
|---|---|---|---|---|---|
| Epoxy resin systems 1 | 10 | 70 | 15 | 0.52 | 0.07 |
| Epoxy resin systems 2 | 5 | 40 | 14.6 | 0.39 | 0.04 |
| Non-impregnated primary product plate | — | — | 0 | 0.28 | 0.32 |

Table 1

Comparison of the volume resistance R and the helium permeability λ of an epoxy resin-impregnated primary product (thickness 1 mm, bulk density 1.0 g/cm³) with a non-impregnated primary product (thickness 1 mm, bulk density 1.0 g/cm³).

As can be seen in Table 1, virtually the same resin content of approximately 15% is achieved after only 5 hours with the low-viscosity epoxy resin systems 2 based on bisphenol-F-diglycidyl ether as with the higher-viscosity epoxy resin systems 1 based on bisphenol-A-diglycidyl ether after an impregnating period of ten hours.

A comparison of the material composite and the non-impregnated primary product shows the following: as a result of the resin impregnation, the helium permeability of the bodies is reduced by a factor of five and eight, respectively. The volume resistance is only slightly increased by the impregnating treatment.

EXAMPLE 2

In this example, the epoxy resin systems 1 were used without a latent catalyst. The primary-product plate employed was of the same type as that employed in Example 1. Similarly, the impregnating conditions were the same as those in Example 1 with regard to the procedure, time and temperature.

The difference, however, is the curing behavior of the resins. In order to cure the impregnated primary-product plate, a curing period of 24 h at 150° C. is required in this example.

The epoxy resin systems 1 have a high storage stability at 50° C. without a latent catalyst. Starting from 30 to 70 mPa·s, the viscosity rises to from 65 to 90 mPa·s at 50° C. after four weeks' storage. Resin systems with a latent catalyst exhibit a rise in viscosity to over 100 mPa·s after only approximately 1 week.

EXAMPLE 3

In this example, the following plates made of partially recompressed expanded graphite (primary-product plates) were impregnated with an isocyanate resin system by immersion at room temperature.

TABLE 2

|  | Type of primary product plate | Thickness [mm] | Bulk density [g/cm³] |
|---|---|---|---|
| Example 3a | F02510C | 0.25 | 1.0 |
| Example 3b | L10010C | 1.0 | 1.0 |
| Example 3c | L20010C | 2.0 | 1.0 |
| Example 3d | L40005C | 4.0 | 0.5 |

Table 2

Plates made of partially recompressed expanded graphite (primary-product plates) used for the impregnation with an isocyanate resin system.

The isocyanate resin system used had the following composition:
100 parts of Blendur VP KU 3-4520
10 parts of Blendur VP PU 90IK06

Both resin components came from the firm Rhein Chemie Rheinau GmbH (Mannheim, Germany). Blendur VP KU 3-4520 is formed of 75–85% by weight of diphenylmethane diisocyanate and 15–25% by weight of bis(4,4'-glycidyloxyphenyl)propane. Blendur VP PU 90IK06 is the latent catalyst which is formed predominantly of modified diphenylmethane diisocyanate, according to the manufacturer's information.

The various primary-product plates were completely immersed in the resin system. After an immersion time of 10 hours, the plates were removed from the resin bath and the resin adhering to the surface was wiped off. The impregnated plates were then put into a preheated circulating-air oven and cured at 160° C. for 30 minutes. After this shock curing, the plates had no blisters or cracks at all.

The resin contents of the primary-product plates listed as well as selected material properties are shown in Table 3 in comparison with non-impregnated primary-product plates.

TABLE 3

|  | Type of primary-product plate | Resin content [%] | R [mΩ] | λ [mg/(m²·s)] |
|---|---|---|---|---|
| Example 3a | F02510C | 29.4 | 0.24 | <0.0015 |
| Example 3b | L10010C | 16.0 | 0.43 | 0.028 |
| Example 3c | L20010C | 11.4 | 0.57 | — |
| Example 3d | L40005C | 38.9 | 0.85 | — |
| Example 3a' | F02510C | 0 | <0.10 | 1.50 |
| Example 3b' | L10010C | 0 | 0.28 | 0.32 |

Table 3

A comparison of the volume resistance R and the helium permeability λ of cured, impregnated primary product (varying thickness and bulk density) with non-impregnated primary product (of likewise varying thickness and bulk density); Examples 3a and 3a' as well as Examples 3b and 3b' in particular, are to be compared.

As is evident from Table 3, the resin uptake or absorption varies depending on the bulk density of the primary product, with a low bulk density resulting in a high resin uptake or absorption. The impregnated primary product may contain up to 40% resin. The helium permeability of the impregnated plates is lower by more than a factor of ten in comparison with non-impregnated plates. The electrical volume resistance is only moderately increased by the impregnating treatment.

EXAMPLE 4

This exemplary embodiment was concerned with the impregnation of a primary-product plate with the epoxy resin systems 1 without a latent catalyst, and the precuring and shaping thereof after the impregnation with synthetic resin.

The primary-product plate made of partially recompressed expanded graphite had a thickness of 2.7 mm and a bulk density of 0.65 g/cm$^3$. The ash value of the graphite was less than or equal to 0.15% by weight. The vacuum impregnation process was performed at 50° C. in accordance with Example 1. After an impregnating period of two hours, the now impregnated plate was taken out of the bath and, after the resin adhering to the surface had been wiped off, weighed. The resin content of the uncured plate was 16%. Subsequently, the plate was put into a circulating-air oven at 150° C. for a period of 20 hours and the resin present in the body was converted into the B state. In the B state the resin present was partially gelled and the impregnated plate was still soft and flexible. It was placed in a pressing die preheated to 180°, pressed into the mold for a period of one hour and, as a result, was further compressed. The plate took on the geometry of the pressing mold which was coated with anti-sticking agent. After the pressing mold had been opened, the impregnated and now partially cured shaped body had sufficient stability for it to be removed from the mold without destruction. After a further heat treatment of the shaped body for 12 hours at 150° C., the resin was completely cured. The cured shaped body showed no cracks or blisters at all. Furthermore, none of the resin in the B state was pressed out of the impregnated body by the pressing, so that a continuous resin layer did not accumulate at the surface of the shaped body. As has been shown in practice, excess resin not previously converted into the B state is squeezed out of the body during the pressing in a shaping apparatus. This squeezed-out resin can form a resin skin on the outer surfaces of the body which has an electrically and thermally insulating action and may be undesirable, depending on the intended use of the product.

EXAMPLE 5

The primary-product plate was of the same type as in Example 4 and had a thickness of 2.7 mm and a bulk density of 0.65 g/cm$^3$. This primary-product plate was immersed in an impregnating resin at room temperature for one hour. This resin was formed of 95 parts by weight of Blendur VP KU 3-4520 and 5 parts by weight of Blendur VP PU 90IK06. (Both components were also used in Example 3 with a slightly different composition). After the impregnation, the resin content of the plate was 15% by weight. The impregnated plate was heated at 150° C. for a period of nine minutes, in the course of which the resin was converted into the B state and partially gelled. This still-warm plate was subsequently placed in the molding die, which was preheated to 150° C., and was pressed into the mold. The pressing mold coated with anti-sticking agent remained closed for five minutes and was then opened, and the body which was cured in the meantime was removed from the pressing mold.

In this example too, none of the resin in the B state was squeezed out of the impregnated body by the pressing, so that a continuous resin layer did not accumulate at the surface of the shaped body and the shaped body showed no electrically insulating action at all in the surface region.

EXAMPLE 6

COMPARISON, PRIOR ART

In this example, a solvent-containing epoxy resin system was deliberately used for the impregnation. The following composition was chosen for the resin system:

75 parts of epoxy resin systems 2 (see Example 1) with the main components bisphenol-F-diglycidyl ether and methylhexahydrophthalic anhydride without a latent catalyst, and 25 parts of 2-butanone (solvent).

The viscosity of this solvent-containing resin system was 15 mPa·s at room temperature. The primary product had a bulk density of 1.0 g/cm$^3$, a plate thickness of 1 mm and an ash value of less than 2% by weight. The vacuum impregnation was carried out as in Example 1, but at room temperature rather than at 50° C. After an impregnating period of 6.5 hours, the now impregnated plate was taken out of the bath and, after the resin adhering to the surface had been wiped off, weighed. The resin content was 23% by weight in the uncured state.

The impregnated plate was then put into a preheated circulating-air oven with a temperature of 150° C. and after a curing period of 30 minutes removed from the oven. The plate was covered in blisters of varying sizes and was completely unusable! Neither a volume resistance nor a helium permeability could be determined thereon.

The cured plate covered in blisters showed a marked decrease in weight as compared with the freshly impregnated state. The resin content had dropped as a result of the curing treatment from 23% in the uncured state to 17.8% in the cured state. This was not observed on the samples of Examples 1 to 5, in which solvent-free resin systems had been employed. The loss in weight in Example 6 was attributable to the evaporation of the solvent. The blisters were forced up because the evaporation of the solvent took place not only at the surface of the impregnated body but also in the interior of the body and escape was hindered by the material layers lying above.

If a plate impregnated with a solvent-containing resin system were pressed in a molding die and cured, as described in Example 4 for solvent-free resin systems, the difficulties would only be compounded, because the released solvent vapors would not be able to escape unhindered and consequently defects and blisters would be formed in the body to an increased extent and in an uncontrollable manner. Production of a shaped body impregnated with a solvent-containing resin by further compression in a pressing apparatus and subsequent curing is not possible in acceptable production times without a massive reduction in quality of the desired end product.

Comparing Example 6 with Examples 1 to 5 clearly shows the progress which has been achieved with the solution according to the invention.

Besides these above-mentioned examples, a multiplicity of further bodies and procedures can be realized according to the teaching of the present invention. Accordingly, the invention is not restricted to the embodiments illustrated in the examples. Variants which are not shown but which a person skilled in the art could produce due to the information offered by this disclosure are therefore also to be included in this patent application.

We claim:

1. A body having been at least one of impregnated and soaked with synthetic resin, comprising:
   expanded graphite recompressed to a bulk density between 0.1 and 1.8 g/cm$^3$;
   said graphite containing a solvent-free, low-viscosity, storage-stable resin system selected from the group consisting of isocyanates and epoxy resins with core-actants thereof and polymers obtained by curing at least one of said resin systems.

2. The body according to claim 1, wherein said epoxy resin system contains bisphenol-A-diglycidyl ether as a main component.

3. The body according to claim 1, wherein said epoxy resin system contains bisphenol-F-diglycidyl ether as a main component.

4. The body according to claim 1, wherein said epoxy resin system contains methylhexahydrophthalic anhydride as a component.

5. The body according to claim 1, wherein said epoxy resin system contains a latent catalyst.

6. The body according to claim 1, wherein said epoxy resin system does not contain a latent catalyst.

7. The body according to claim 1, wherein said resin system is selected from the group of epoxides having a viscosity, at 50° C., of less than 200 mPa·s over a period of more than two days.

8. The body according to claim 1, wherein said resin system is selected from the group of epoxides having a viscosity, at 50° C., of 150 mPa·s and below over a period of more than two days.

9. The body according to claim 1, wherein said resin system is selected from the group of epoxides having a viscosity, at 50° C., of less than 200 mPa·s over a period of more than two weeks.

10. The body according to claim 1, wherein said resin system is selected from the group of epoxides having a viscosity, at 50° C., of 150 mPa·s and below over a period of more than two weeks.

11. The body according to claim 1, wherein said resin system contains a main component diphenylmethane diisocyanate.

12. The body according to claim 1, wherein said resin system contains main components diphenylmethane diisocyanate and bis (4,4'-glycidyloxyphenyl)propane.

13. The body according to claim 1, wherein said resin system includes said isocyanates and at least one latent catalyst.

14. The body according to claim 1, wherein said resin system is formed from said isocyanates with said co-reactants and has a storage stability at room temperature of more than two days.

15. The body according to claim 1, wherein said resin system is formed from said isocyanates with said co-reactants in said graphite impregnated and has a storage stability at room temperature of more than two weeks.

16. The body according to claim 1, including up to 50% by weight of at least one resin selected from the group consisting of isocyanates, isocyanurates, urethanes, polyurethanes, and epoxides.

17. The body according to claim 1, including 5 to 25% by weight of at least one resin selected from the group consisting of isocyanates, isocyanurates, urethanes, polyurethanes, and epoxides.

18. The body according to claim 1, including 10 to 20% by weight of at least one resin selected from the group consisting of isocyanates, isocyanurates, urethanes, polyurethanes, and epoxides.

19. The body according to claim 1, wherein a primary product contains fillers selected from the group consisting of ceramic electrically non-conductive, ceramic electrically conductive, mineral electrically non-conductive, and mineral electrically conductive fillers.

20. The body according to claim 1, including at least two independently held together networks, one of said networks being formed of a connected framework made of expanded graphite having good electrical conductivity and good thermal conductivity, and the other of said networks being formed of a connected system made of synthetic material having penetrated into said graphite.

21. The body according to claim 20, wherein said resin system is disposed only in regions close to a surface or in a part of the body.

22. The body according to claim 21, including cured polymer resin systems formed from one of said groups.

23. The body according to claim 22, wherein a resin surface film is not continuous over the body to form an electrical contact.

24. A sealing element, comprising:
a body impregnated or soaked with synthetic resin having expanded graphite recompressed to a bulk density between 0.1 and 1.8 g/cm$^3$; said graphite containing a solvent-free, low-viscosity, storage-stable resin system from the group consisting of isocyanates and epoxy resins with co-reactants thereof and polymers obtained by curing at least one of said resin systems.

25. A fuel cell component, comprising:
a body impregnated or soaked with synthetic resin having expanded graphite recompressed to a bulk density between 0.1 and 1.8 g/cm$^3$; said graphite containing a solvent-free, low-viscosity storage-stable resin system from the group consisting of isocyanates and epoxy resins with co-reactants thereof and polymers obtained by curing at least one of said resin systems.

26. A heat-conducting elements comprising:
a body impregnated or soaked with synthetic resin having expanded graphite recompressed to a bulk density between 0.1 and 1.8 g/cm$^3$; said graphite containing a solvent-free, low-viscosity, storage-stable resin system from the group consisting of isocyanates and epoxy resins with co-reactants thereof and polymers obtained by curing at least one of said resin systems.

27. The body according to claim 1, wherein said resin forms at most 50% of a weight of the body.

* * * * *